United States Patent [19]

Nanasawa et al.

[11] 4,324,970
[45] Apr. 13, 1982

[54] WIRE CUT METHOD OF SHAPING WORKPIECE BY ELECTRIC DISCHARGE

[75] Inventors: Yoshifumi Nanasawa; Kazuhiko Kobayashi, both of Nagoya, Japan

[73] Assignee: Mitsubushiki Denki Kabushiki Kaisha, Tokyo, Japan

[21] Appl. No.: 158,457

[22] Filed: Jun. 11, 1980

[30] Foreign Application Priority Data

Jun. 26, 1979 [JP] Japan ................................. 54-80530
Jun. 26, 1979 [JP] Japan ................................. 54-80531

[51] Int. Cl.³ .............................................. B23P 1/08
[52] U.S. Cl. .............................. 219/69 W; 219/69 M; 219/69 G
[58] Field of Search .............. 219/69 M, 69 G, 69 W, 219/69 R, 383, 68, 69 V; 83/15, 16

[56] References Cited

U.S. PATENT DOCUMENTS

| | | | |
|---|---|---|---|
| 3,247,599 | 4/1966 | O'Connor | 219/69 G |
| 3,731,044 | 5/1973 | Ullmann et al. | 219/69 G |
| 4,052,583 | 10/1977 | Inoue | 219/69 W |
| 4,052,584 | 10/1977 | Reznicek | 219/69 W |
| 4,121,081 | 10/1978 | Baker | 219/69 M |

FOREIGN PATENT DOCUMENTS 39892  3/1977  Japan ................. 219/69 W

*Primary Examiner*—B. A. Reynolds
*Assistant Examiner*—M. Paschall
*Attorney, Agent, or Firm*—Oblon, Fisher, Spivak, McClelland & Maier

[57] ABSTRACT

A method of cutting a workpiece in a desired configuration by using an electric discharge and relatively moving the workpiece and a wire electrode. When cutting a waste work part of the configuration, the wire electrode is stopped and shifted backwardly for a predetermined distance. The wire electrode is then shifted perpendicular to the work direction until it contacts the wall of the workpiece so as to measure the discharge gap.

9 Claims, 11 Drawing Figures

F I G. 2
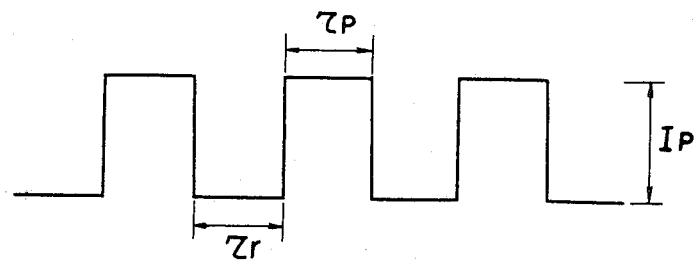
F I G. 3
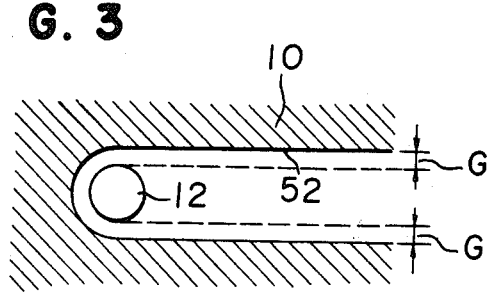
F I G. 4
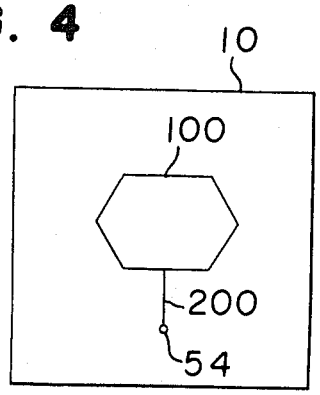

WIRE CUT METHOD OF SHAPING WORKPIECE BY ELECTRIC DISCHARGE

BACKGROUND OF THE INVENTION

1. Field of the Invention

The present invention relates to a wire cut method of shaping a workpiece by electric discharge. More particularly, it relates to an improved wire electrode offset treatment.

2. Description of the Prior Arts

It has been well-known to provide a wire cut method of shaping a workpiece by electric discharge to form a desired work configuration by relatively moving a workpiece to a wire electrode. This method is advantageous for shaping a workpiece in a complicated configuration in high accuracy.

FIG. 1 shows one embodiment of a conventional wire cut electric discharge machine wherein a wire electrode (12) is placed to face a workpiece (10) and a work liquid (14) is injected from a tank (16) through a pump (18) and a nozzle (20) into a work area. In order to carry out the relative movement of the workpiece (10) and the wire electrode (12) along the desired configuration, a table (22) on which the workpiece (10) is placed, is moved to two-dimensional directions along X-Y axis plane by an X-axis motor (24) and a Y-axis motor (26). A control signal is fed from a control device (28) to the motors (24), (26) whereby the relative movement of the workpiece (10) and the wire electrode (12) is controlled so as to correspond the desired configuration. The control device (28) can be an NC control device, a follow control device or a computer. The wire electrode (12) is taken out from a wire feed reel (30) and is fed to the workpiece by a current feeder (32) and an upper wire guide (34) and then, it is wound through a lower wire guide (36) on a wire winder and tension reel (38). An electric discharge energy is fed from a power source (40) for the work into a gap between the workpiece (10) and a wire electrode (12). The power source (40) for the work comprises a DC power source (42), a switching element (44) such as a transistor; a capacitor (46), a resistor (48) for charging and a switching element control circuit (50). The output voltage for the power source is fed from a current feeder (32).

FIG. 2 shows a pulse waveform output from the switching element (44) of the power source (40) for work shown in FIG. 1. In the waveform, a current peak value $I_p$, a pulse length $\tau_p$ and a pulse quiescent length $\tau_r$ are shown.

In the conventional wire cut electric discharge machine, the electric discharge is formed in the gap between the workpiece (10) and the wire electrode (12) to work the workpiece (10) in a desired configuration by the electric discharge.

As shown in FIG. 3, a work groove (52) has a width given by the work condition. In order to give a precise work configuration, it is necessary to control the relative movement between the workpiece (10) and the wire electrode (12) depending upon the width of the work groove. Therefore, the wire electrode (12) should be controlled for the relative movement to the workpiece (10) at a position shifted for a desired offset from the desired configuration by the work. As it is clearly found in FIG. 3, the offset is given by a radius of the wire electrode (12) and a discharge gap G. A diameter of the wire electrode (12) is usually in a range of about 0.05 to 0.3 mm. This is precisely decided depending upon the kind of the wire electrode (12). The discharge gap G is remarkably varied depending upon the DC peak valve $I_p$, the pulse length $\tau_p$ and the pulse quiescent length $\tau_r$, shown in FIG. 2 and the electric work condition such as a gap voltage in the discharge gap; and the specific resistance of the work liquid, the kind and thickness of the workpiece (10) and the mechanical condition such as a work feeding speed. The discharge gap G is varied depending upon the fluctuation of these conditions in each operation. It is difficult to precisely decide the offset depending upon the variable discharge gap G. Therefore, it has not been attained to work a workpiece in a highly precise work configuration by the conventional machine.

In the conventional machine, a test work is carried out before each main work for shaping a workpiece in a desired work configuration by the electric discharge. The discharge gap G is measured on the test work to decide the offset. In accordance with the test work, however, it takes a long time for calculating the offset and it requires the complicated test work and it is not easy to provide a high accuracy because of individual difference for the measurement.

SUMMARY OF THE INVENTION

The present invention is to overcome the above-mentioned disadvantages and is to provide an improved wire cut method of shaping a workpiece by electric discharge with a precise and simple measurement of an offset.

The foregoing and other objects of the present invention have been attained by providing the wire cut method of shaping a workpiece in a desired work configuration by relative movements of the workpiece and the wire electrode wherein a waste work for a part out of the work configuration of the workpiece is stopped and a wire electrode is backwardly shifted for a predetermined distance from the stopped position in the waste work and the wire electrode is shifted in perpendicular to the work direction at the shifted position so as to measure a discharge gap by contacting the wire electrodes with walls of the workpiece whereby an offset is calculated. The offset is calculated by an automatic sequential control with a predetermined program.

BRIEF DESCRIPTION OF THE DRAWINGS

FIG. 2 is the waveform of the output of the switching element of the power source for operation;

FIG. 3 is a sectional view of the configuration of the work groove by the wire electrode;

FIG. 4 is a view of one example of a workpiece shaped by the wire cut method of the present invention;

DETAILED DESCRIPTION OF THE PREFERRED EMBODIMENTS

Figure 1:
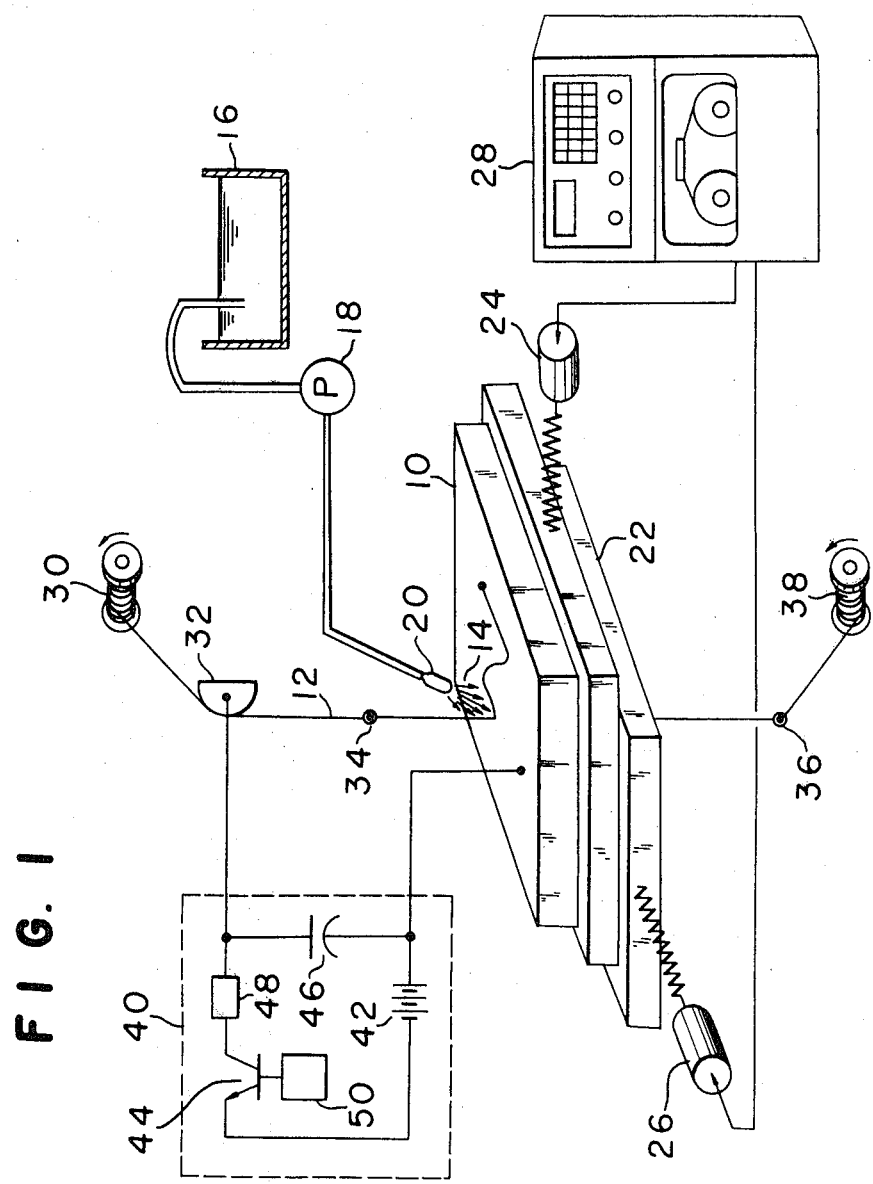
FIG. 1 is a schematic view of the conventional wire cut method of shaping a workpiece by electric discharge.

Referring to the drawings, preferred embodiments of the present invention will be illustrated.

FIG. 4 shows the configuration of the workpiece (10) shaped by the method of the present invention. The workpiece (10) is hollowed out along the line (100) of hexagonal configuration. The hexagonal hollow is used as a product such as a mold. In accordance with the present invention, it is not necessary to carry out the conventional test work for the offset. The offset can be measured during a waste work of the workpiece (10) before a step of the main work of the workpiece in the desired work configuration (100). In the embodiment shown in FIG. 4, a lead passage (200) for leading the wire electrode (12) from a hole (54) for work to the work configuration (100) is used as a waste work, and the offset is precisely calculated during the waste work for the lead passage (200) required for leading the wire electrode (12) into the desired work configuration.

Figure 5:
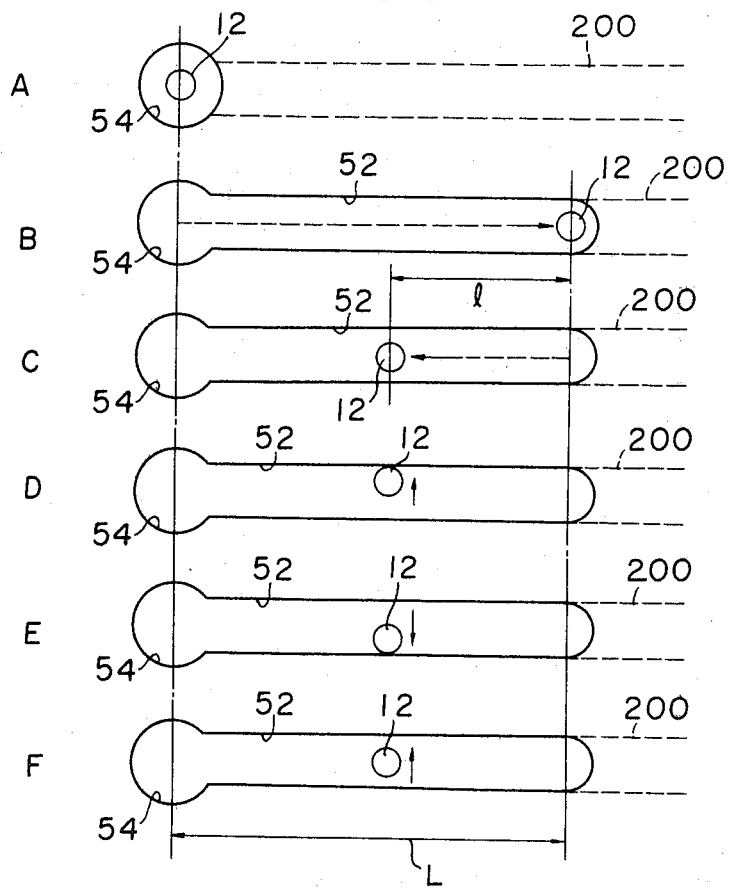
FIG. 5 shows steps of shaping the workpiece according to the present invention.
Figure 6:
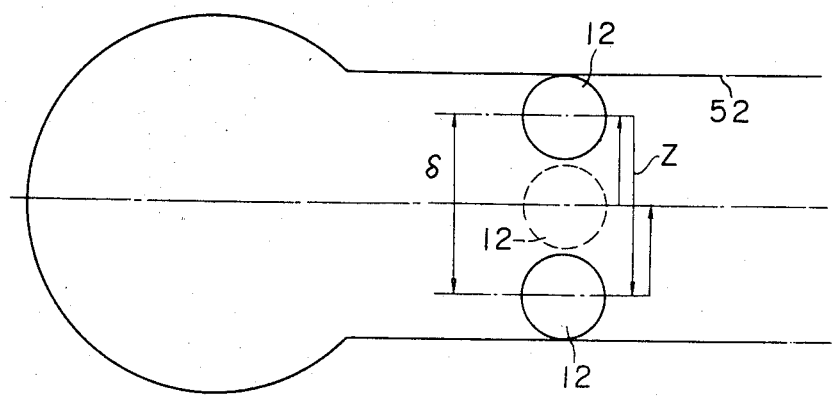
FIG. 6 shows a step of measuring a discharge gap in FIG. 5.

FIG. 5 shows the step of measuring the offset by the method of the present invention. In FIG. 5A, the wire electrode (12) is inserted into the hole (54) for work so as to carry out the waste work along the lead passage (200) shown by the broke line in the initial position. In FIG. 5B, the waste work is stopped when the wire electrode (12) is in the way of the lead passage (200). During the waste work from the position shown in FIG. 5A to the position shown in FIG. 5B, the stable electric discharging condition is attained. Normally, the cut obtained is essentially symmetrical in the direction perpendicular to the direction of travel at the electrode. Hence, the gaps obtained on opposite sides of the electrode will be equal. The wire electrode (12) is backwardly shifted for a predetermined distance l in the work groove as shown in FIG. 5C so as to depart from the position stopped in the waste work shown in FIG. 5B. In the backward movement and the following perpendicular measuring movements, the electrode is not energized so that the gap is not further enlarged by this action. The wire electrode (12) is shifted in perpendicular to the work direction from the position shown in FIG. 5C. The shift in the perpendicular direction is continued until contacting the wire electrode (12) with walls of the workpiece (10) to measure the discharge gap. The wall may be detected in any known manner, but the preferred method is to sense the tension on the wire electrode. In FIG. 5D, the wire electrode (12) is upwardly shifted to contact with the wall of the work groove (52). In FIG. 5E, the wire electrode (12) is downwardly shifted to contact with the wall of the work groove (52). FIG. 6 shows the enlarged view of the part in the condition for the measurement. The center of the wire electrode (12) is reciprocally shifted as shown by the arrow line Z and the shift distance δ of the center of the wire electrode (12) is measured. The discharge gap G is calculated by δ/2. The offset for the wire electrode (12) can be calculated by the discharge gap and the diameter of the wire electrode (12). The above-mentioned steps are carried out under an automatic sequential control with a desired program memorized in the computer of the control device (28). In the method of the present invention, the stop and the backward shift of the wire electrode (12) and the measurement of the discharge gap by the contact of the wire electrode (12) with the walls of the workpiece (10) and the calculation of the offset are automatically carried out.

After calculating the offset, the wire electrode (12) is returned to the position shown in FIG. 5F at the center of the lead passage (200) and the work is restarted to lead the wire electrode from the lead passage (200) to the line of the work configuration (100) with the predetermined offset.

In the above-mentioned embodiment, the discharge gap is measured at only one position in the lead passage (200). It is preferable to measure the discharge gaps for plural times at different positions in the waste work region L.

The offset treatment can be carried out by using an NC control device.

Figure 7:
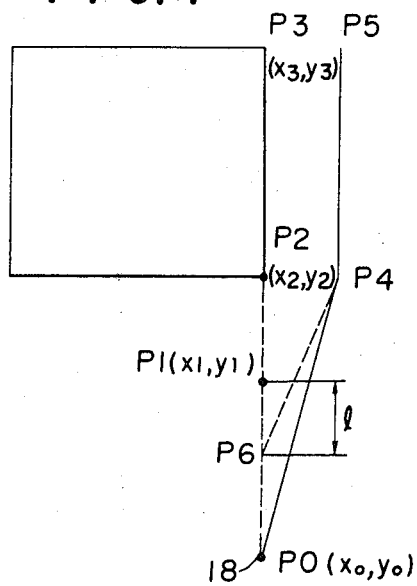
FIG. 7 shows one embodiment of the method of shaping the workpiece according to the present invention.

Referring to FIG. 7, the NC tape commands in the practical operation will be shown N001G90: designation for absolute value command (N001: sequence number)

N002G92Xx0Yy0: designation of origin of coordinate at $P_0$

N003G1Xx1Yy1: linear shift to $P_1$ (stable condition of electric discharge)

N004M00: program stop: work stop

N005G42Xx2Yy2: linear shift to $P_4$ after offset treatment

N006G1Xx3Yy3: linear shift to $P_5$

The above-mentioned commands are to form the offset by the manual operation. At the time of the program stop, the wire electrode is backwardly shifted for a predetermined distance l shown in FIG. 7 by the manual operation. At the position, the wire electrode is shifted in perpendicular to the work direction to measure the discharge gap. The measured value is input into the NC control device and the calculation of the offset is automatically carried out. Therefore, the method of the present invention can be easily carried out by combining the sequential control into the NC control device.

The method of the present invention using the NC control device can be also carried out by the commands of an NC tape. The NC tape commands wil be shown N001G90: designation for absolute value command (N001: sequence number)

N002G92Xx0Yy0: designation of origin of coordinate at $P_0$

N003G42Xx2Yy2: linear shift to $P_4$ after offset treatment

N004G1Xx3Yy3: linear shift to $P_5$

When the command of N003G42Xx2Yy2 is input, the automatic sequential control is carried out by the computer in the NC control device whereby the wire electrode is automatically shifted to the coordinate $P_1$ and then it is automatically backwardly shifted for a predetermined distance l. The offset is automatically measured at the position. The work by the electrical discharge is carried out depending upon the offset. In accordance with the present invention, the offset treatment can be automatically carried out by using a simple NC tape.

Figure 8:
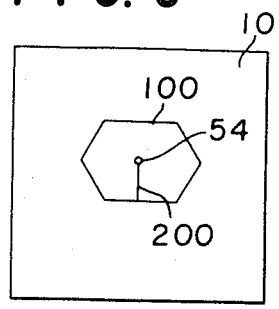
FIGS. 8, 9 and 10 respectively show workpiece shaped by the method of the present invention.

FIG. 8 shows the other configuration of the workpiece (10) for the offset treatment according to the present invention. In FIG. 8, the workpiece (10) hollowed out in a hexagonal shape (100) is used as a product such as a mold. Therefore, the hole (54) for the work is formed within the hexagonal configuration (100), and the lead passage (200) is formed from the hole (54) to the line of the work configuration (100). In the embodiment of FIG. 8, the lead passage (200) is used for a waste work as that of FIG. 4. During the waste work, the offset is automatically measured by said steps.

The waste work is not limited to the operation in the lead passae (200) and can be carried out in any position out of the work configuration of the workpiece.

Figure 9:
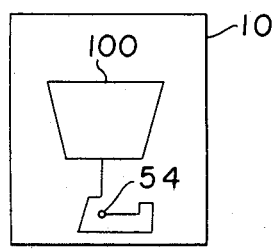
Figure 10:
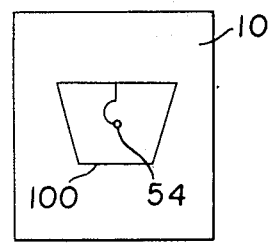

In FIGS. 9 and 10, the waste works can be carried out at each desired position out of the work configuration of the workpiece (10) so as to form a discretional linear or curved line. The configuration in the waste work can be a discretional configuration for providing a precise offset data for two dimentional directions in the case of different electric discharge gaps between the workpiece (10) and the wire electrode (12) in the two dimentional directions such as directions to X-axis and Y-axis or in the forward directions.

Figure 11:
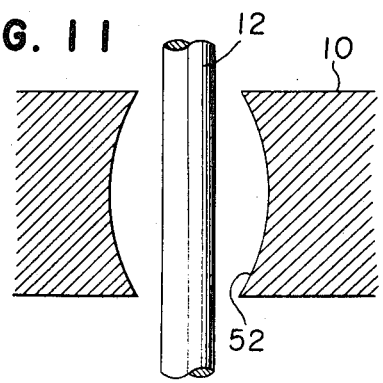
FIG. 11 is a partially enlarged sectional view of a configuration of a work groove.

The work groove (52) of the workpiece (10) has different widths of the groove along the axial direction of the wire electrode (12) as shown in FIG. 11 in the practical operation. The difference of the widths of the groove is substantially the same. Therefore, the stable work configuration in high accuracy can be obtained by setting the widths of the groove at any position.

As described above, in accordance with the method of the present invention, it is unnecessary to carry out the test work in the conventional work and it is possible to carry out the offset treatment in high accuracy for a quite short time. Moreover, it is remarkably effective for the full automatic electric discharge work.

We claim:

1. In a wire cut method of shaping a workpiece by electric discharge in a desired work configuration by relative movements of said workpiece and a wire electride, an improvement characterized in that an electro-discharge machining of the workpiece in a waste portion of said workpiece is stopped and said wire electrode is backwardly shifted without being energized for a predetermined distance along the machine portion from said stopped position in said waste work and said wire electrode is shifted in a direction perpendicular to the direction of the machined portion at said shifted position so as to measure a discharge gap by contacting said wire electrode with a wall of said workpiece whereby an offset is calculated.

2. The wire cut electric discharge work method according to claim 1 wherein said waste work is carried out in a lead passage from a hole for initiation of said work to a line of said work configuration.

3. The wire cut electric discharge work method according to claim 1 or 2 wherein said measurement of said discharge gap is carried out for plural times at different positions in said waste work region.

4. The wire cut electric discharge work method according to claim 1 wherein said offset of said wire electrode is automatically calculated by an automatic sequential control with a predetermined program.

5. The wire cut electric discharge work method according to claim 4 wherein said waste work is carried out in a lead passage from a hole for initiation of said work to a line of said work configuration.

6. The wire cut electric discharge work method according to claim 4 or 5 wherein said measurement of said discharge gap is carried out for plural times at different positions in said waste work region.

7. The wire cut electric discharge work method according to claim 1 wherein said wire electrode is reciprocally shifted in perpendicular to said work direction to measure said discharge gap from the perpendicularly shifted distance of said wire electrode measured by contacting said wire electrodes with walls of said workpiece and said offset of said wire electrode is automatically calculated from said discharge gap and a diameter of said wire electrode.

8. The wire cut electric discharge work method according to claim 7 wherein said waste work is carried out in a lead passage from a hole for initiation of said work to a line of said work configuration.

9. The wire cut electric discharge work method according to claim 7 or 8 wherein said measurement of said discharge gap is carried out for plural times at different positions in said waste work region.

* * * * *

UNITED STATES PATENT AND TRADEMARK OFFICE
CERTIFICATE OF CORRECTION

PATENT NO. : 4,324,970
DATED : April 13, 1982
INVENTOR(S) : Yoshifumi Nanasawa

It is certified that error appears in the above—identified patent and that said Letters Patent is hereby corrected as shown below:

On The Title Page, item (73) should read

--[73] Assignee: Mitsubishi Denki Kabushiki Kaisha

Tokyo, Japan --

Signed and Sealed this

Sixth Day of July 1982

[SEAL]

Attest:

GERALD J. MOSSINGHOFF

*Attesting Officer*     *Commissioner of Patents and Trademarks*